United States Patent
Jones et al.

[11] Patent Number: 6,082,863
[45] Date of Patent: Jul. 4, 2000

[54] COLOR PROJECTION PRISM

[75] Inventors: Philip J. Jones, Wiltshire, United Kingdom; Brian E. Loucks, Los Altos, Calif.

[73] Assignee: Raychem Corporation, Menlo Park, Calif.

[21] Appl. No.: 08/869,308

[22] Filed: Jun. 4, 1997

Related U.S. Application Data

[63] Continuation of application No. 08/812,914, Mar. 10, 1997, abandoned, which is a continuation of application No. 08/699,892, Aug. 16, 1996, abandoned.

[51] Int. Cl.$^7$ .................................................. G03B 21/14
[52] U.S. Cl. ........................... 353/33; 353/81; 359/638; 359/834
[58] Field of Search ................................. 353/31, 33, 34, 353/81; 349/8; 359/638, 639, 640, 629, 834, 837

[56] References Cited

U.S. PATENT DOCUMENTS

| | | | |
|---|---|---|---|
| 3,905,684 | 9/1975 | Cook et al. | 350/173 |
| 4,687,301 | 8/1987 | Ledebuhr | 350/401 |
| 4,715,684 | 12/1987 | Gagnon | 353/33 |
| 4,726,662 | 2/1988 | Cromack | 350/345 |
| 4,913,528 | 4/1990 | Hasegawa | 350/286 |
| 4,943,154 | 7/1990 | Miyataka et al. | 353/31 |
| 4,943,155 | 7/1990 | Cross | 353/33 |
| 4,969,730 | 11/1990 | van den Brandt | 353/31 |
| 4,983,032 | 1/1991 | Van Den Brandt | 353/30 |
| 5,098,183 | 3/1992 | Sonehara | 353/31 |
| 5,105,265 | 4/1992 | Sato et al. | 358/60 |
| 5,130,826 | 7/1992 | Takanashi et al. | 359/40 |
| 5,172,222 | 12/1992 | Plantier et al. | 358/61 |
| 5,172,254 | 12/1992 | Atarashi et al. | 359/41 |
| 5,309,188 | 5/1994 | Burstyn | 353/33 |
| 5,357,289 | 10/1994 | Konno et al. | 348/757 |
| 5,398,081 | 3/1995 | Jones | 348/742 |
| 5,621,486 | 4/1997 | Doany et al. | 353/34 |
| 5,648,860 | 7/1997 | Ooi et al. | 353/34 |
| 5,658,060 | 8/1997 | Dove | 353/33 |
| 5,704,701 | 1/1998 | Kavanagh et al. | 353/33 |

FOREIGN PATENT DOCUMENTS

| | | | |
|---|---|---|---|
| 0295137 A1 | 12/1988 | European Pat. Off. | H04N 9/31 |
| 0362776 A3 | 4/1990 | European Pat. Off. | G09F 9/35 |
| WO96/13943 | 5/1996 | WIPO | H04N 9/31 |

OTHER PUBLICATIONS

Nagae et al., "Compact Liquid–Crystal Projectors with High Optical Efficiency," SID95 Digest, pp. 223–226 (1995).

*Primary Examiner*—William Dowling
*Attorney, Agent, or Firm*—Fish & Richardson P.C.

[57] ABSTRACT

A prism for color dispersion and recombination and a projector incorporating the prism. The prism comprises an aperture for a light beam and the normal to the aperture defines an optic axis. A first surface, intersecting the optic axis, is oriented at a first angle to the optic axis. The first angle is greater than 45°. The first surface disperses the light beam into a first component and an intermediate component. A second surface, intersecting the optic axis, is oriented at a second angle to the optic axis. The second surface disperses the intermediate component of the light beam into a second component and a third component.

21 Claims, 6 Drawing Sheets

Prior Art

COLOR PROJECTION PRISM

CROSS-REFERENCE TO RELATED APPLICATIONS

This application is a continuation of U.S. application Ser. No. 08/812,914 filed Mar. 10, 1997, and now abandoned which is a filewrapper contination of U.S. application Ser. No. 08/699,892 filed Aug. 16, 1996, now abandoned.

BACKGROUND OF THE INVENTION

The present invention is directed to projection prisms, and more particularly to color projection prisms for dispersing and recombining light.

Color dispersement and recombination are important aspects of color projection systems. In these systems, white light is created from, for example, an arc lamp. A prism or other such device is used to disperse the white light into three components: a red beam, a green beam and a blue beam. These beams may be directed to reflective liquid crystal cells that interfere with and selectively reflect each beam. In other words, the interference imparts an image to each color beam. More particularly, the reflective liquid crystal cells are often active matrix cells with a switching element for each pixel allowing each pixel to be individually addressed. The colors are recombined, and when projected on a screen form a full color image.

Figure 1:
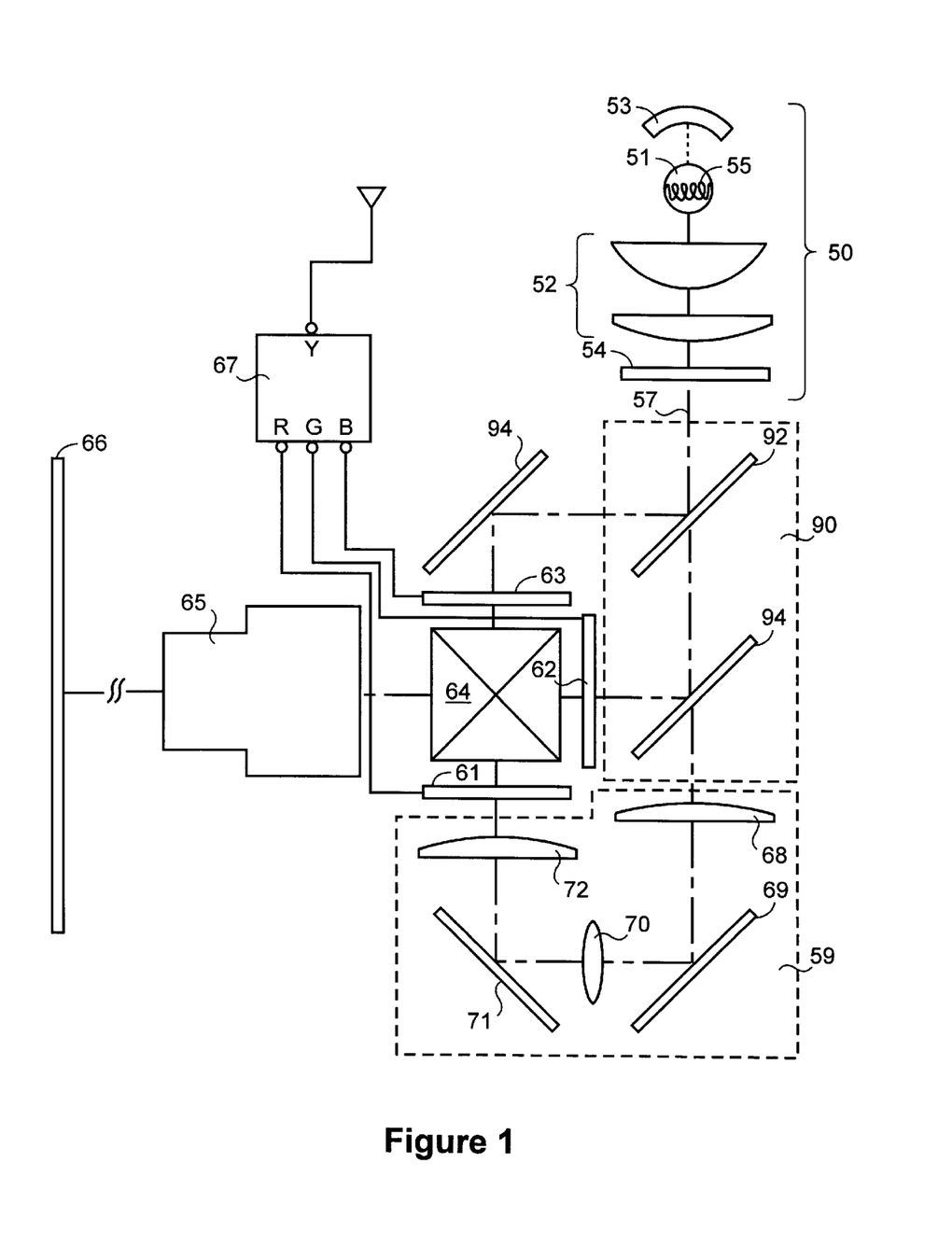
FIG. 1 is a top plan view of a more detailed prior art projection system.

U.S. Pat. No. 4,943,154, issued Jul. 24, 1990, discloses a prior art projection system, as shown in FIG. 1. This system comprises a light source 50; a light transmitter 59; light valves 61, 62 and 63; a light combiner 64; a projection lens 65; a drive circuit 67; an input side convergent lens 68; an input side plane mirror 69; a central convergent lens 70; an output side plane mirror 71; and an output side convergent lens 72. The light source 50 comprises a lamp 51, a condenser lens 52, a concave mirror 53, and a heat absorbing filter 54. The lamp 51 radiates a light containing three primary colors of red, green and blue. Rays of the radiant light from the lamp 51 are arranged in approximately parallel rays by the condenser lens 52 and the concave mirror 53. More specifically, the rays of light from the center of a luminous element 55 in the lamp 51 are transmitted in parallel to the optic axis 57 by the condenser lens 52. From the light rays passed through the condenser lens 52, infrared rays are eliminated by the heat absorbing filter 54. The light rays from the light source 50 are separated into three primary colors of red, green and blue. Red light passes through the light transmitter 59 and enters the red light valve 61. Green light is similarly transmitted to the green light valve 62., and blue light is transmitted to the blue light valve 63.

Figure 2A:
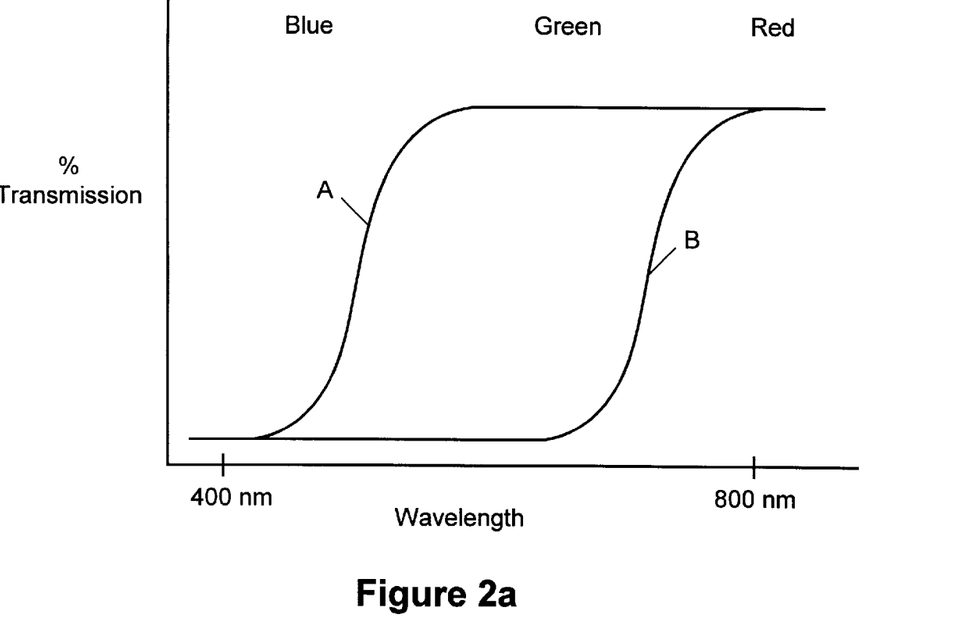
FIGS. 2(a) and 2(b) are graphs of transmissivity and reflectivity, respectively, for plates 92 and 94 of FIG. 1.
Figure 2B:
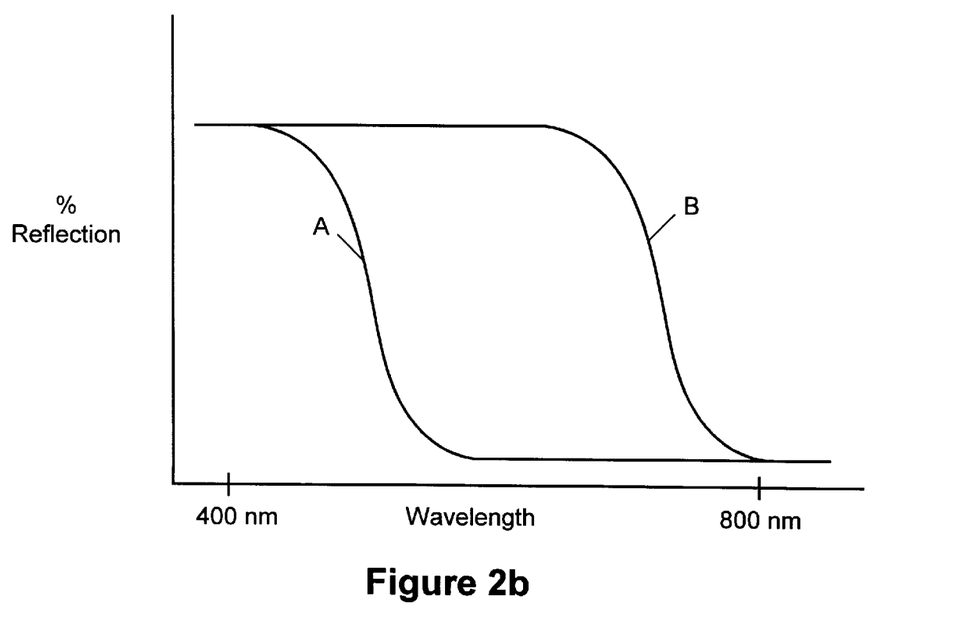

A light separator 90 is used to disperse the light into colored beams of red, green and blue. Separator 90 is shown having two plates 92 and 94. The transmissive and reflective properties of these plates are shown in the graphs of FIGS. 2(a) and 2(b). FIG. 2(a) is a graph of transmission (in percent) as a function of wavelength (in nanometers (nm)) for plates 92 and 94, corresponding to curves A and B, respectively. FIG. 2(b) is a graph of reflection (in percent) as a function of wavelength (in nanometers) for the same plates. In particular, FIG. 2(a) shows that plate 92, corresponding to curve A, has a low transmissivity for blue light but a high transmissivity for green and red. Plate 94, corresponding to curve B, has a low transmissivity for blue and green light but a high transmissivity for red. Put another way, and as shown in FIG. 2(b), plate 92 reflects the blue light but transmits green and red. Of the green and red light that remains, plate 94 reflects the green but transmits the red.

Thus, the two plates may be used to disperse the light before the light enters light valves 61, 62 and 63.

The light valves 61, 62 and 63 are liquid crystal panels each having matrix electrodes. The drive circuit 67 produces electric signals R, G and B according to a video signal Y to control the transmittance of pixels in respective light valves 61, 62 and 63. The modulated light outputs from the light valves 61, 62 and 63 are then combined into a composite flux of light substantially to reproduce a color picture at the position of the light valve 62. An enlarged image of the color picture is finally projected by the projection lens 65 onto a screen 66.

Light combiner 64 may also be used to disperse the light into the different colors (this system is not shown). In this case, the light disperser/combiner often includes dichroic surfaces such as coated plates of glass or an internally-coated cemented prism structure. Coatings used as dichroic surfaces are typically thin films.

A disadvantage of coated plates is that such plates can introduce astigmatism in the optical path. Inserting additional non-coated plates may compensate for this defect at the expense of simplicity.

Prism structures have many advantages. They are typically rugged, easy to mount, and useful for beam superposition applications. They deform less when subjected to stress than coated plates. Coatings used in prisms are resistant to degradation because they are usually sealed within the body of the cube.

Prism structures may also have some disadvantages. One may be a polarization dependence of the reflected light arising from the coatings for the interior surfaces. These coatings may be multilayered and reflective. As the angle of the plane of the coating to the direction of light moves away from 90°, spectral differences between the polarization components increase. In other words, the reflected light becomes at least partially polarized for some range of wavelengths, referred to as the transition region.

Figure 3A:
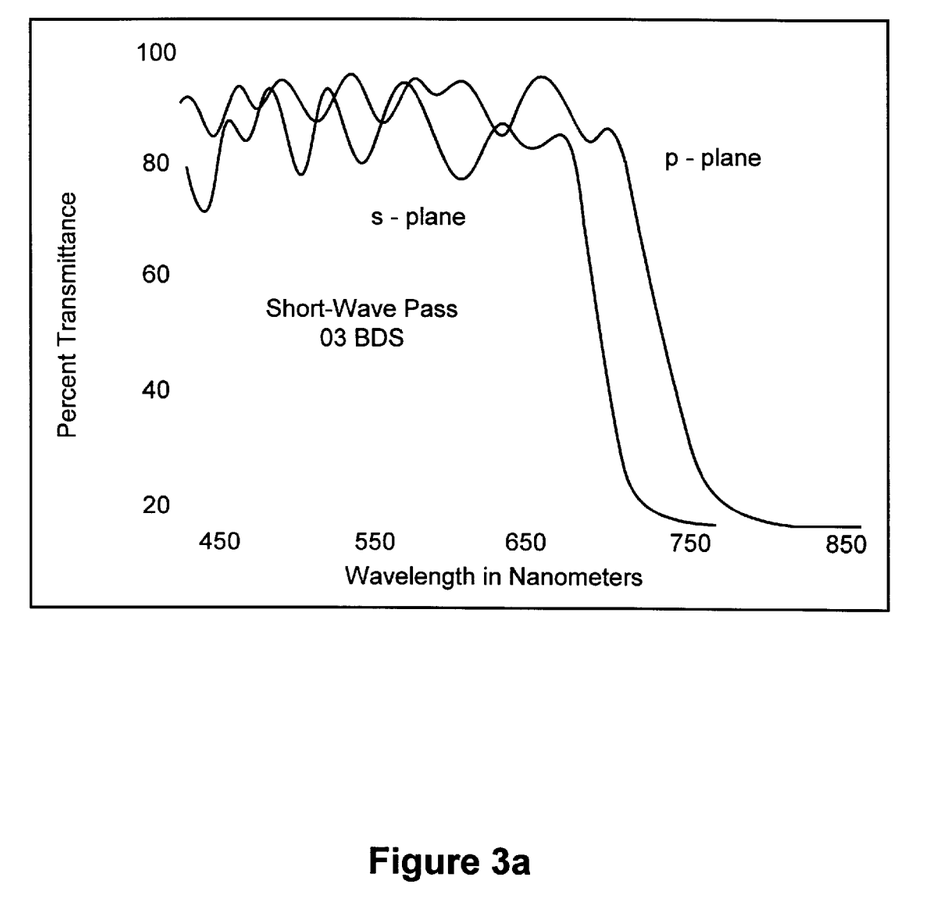
FIGS. 3(a) and 3(b) are graphs showing spectral differences between polarization components.

This effect may be seen, e.g., in FIG. 3(a), which shows the corresponding curves for transmittance for a short-wave-pass beamsplitter or prism at 45°. In FIG. 3(a), the transmission (in percent) is plotted versus wavelength (in nm). The action of the beamsplitter is seen to be dependent on the polarization of the light. S-polarized light, i.e., light which has its electric field perpendicular to the plane of incidence, has a transmittance curve which is shifted relative to that for p-polarized light, the latter being light which has its electric field parallel to the plane of incidence. The amount of shifting is seen to be roughly 50 nm towards lower wavelengths. Thus, the transition region, in which polarization components may be subject to spectral differences, is about 50 nm wide.

Figure 3B:
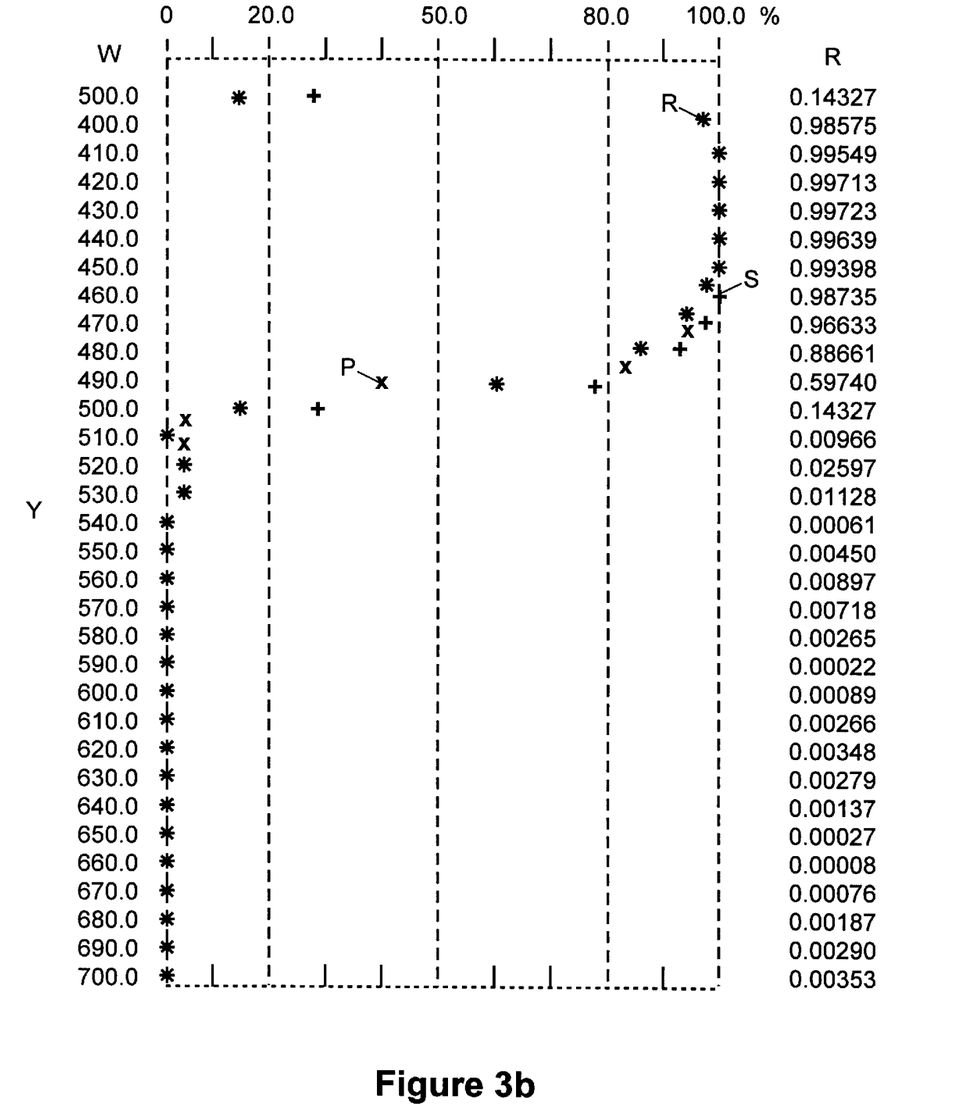

Some beamsplitters have been constructed which reduce the spectral difference between the polarization components. FIG. 3(b) shows plots of wavelength (in nm) versus reflection (in percent) for light of random polarization (*), s-polarization (+), and p-polarization (×) for a blue mirror made by Doctor Optic, GmbH of Vienna, Austria. It is seen that the s-polarization component is shifted from the p-polarization component by about 5 nm. Thus, the transition region, in which polarization components may be subject to spectral differences, is much smaller and is about 5 nm wide.

The partially polarized light is usually incident on the cell which imparts an image to the light. The cell, which may use a scattering liquid crystal material, may have at least a partial depolarizing effect. This may be undesirable. For example, if the incident beam is highly polarized, and the cell depolarizes that same state of polarization, then the intensity of the beam passing back through the prism may be attenuated. In extreme cases, the intensity may drop to about half the incident intensity because the beam is not properly reflected.

This type of attenuation is generally caused by each of the three cells. The overall effect is to reduce the transmission of the prism system. For example, a typical ratio of the amount of light exiting the prism system to that entering is about fifty percent for dichroic surfaces that are oriented 45° to the direction of the light. For cells that use polarization of the light for their optical action, this polarizing effect can be used to increase their contrast ratio. However, this may severely attenuate the light intensity, perhaps by about sixty percent.

Some solutions have been proposed for the above problems. For example, U.S. Pat. No. 4,969,730, issued Nov. 13, 1990, discloses a prism system with two air gaps. While these air gaps may reduce attenuation, they may produce undesirable "ghost" images.

Accordingly, an object of the invention is to provide an optical prism in which the ratio of the amount of light exiting the prism system to the amount entering is maximized.

Another object is to provide a prism system for color dispersement and recombination in which dispersement occurs while introducing a minimum of polarization in the dispersed light.

Additional objects and advantages of the invention will be set forth in the description which follows, and in part will be obvious from the description, or may be learned by practice of the invention. The advantages of the invention may be realized and obtained by means of the instrumentalities and combinations particularly pointed out in the claims.

SUMMARY OF THE INVENTION

In one aspect, the present invention is directed to a prism for color dispersion and recombination. The prism comprises an aperture for a light beam. The normal to the aperture defines an optic axis. A first surface, intersecting the optic axis, is oriented at a first angle to the optic axis. The first angle is greater than 45°. The first surface disperses the light beam into a first component and an intermediate component. First, second and third working faces are located along different segments of the periphery of the prism. A second surface, intersecting the optic axis, and oriented at a second angle to the optic axis, disperses the intermediate component of the light beam into a second component and a third component. At least one of the first, second or third components passes directly to the first, second or third working faces, respectively, from one of the first or second surfaces.

Implementations include the following features. The prism may further comprise first, second and third cells for imparting images to the first, second and third components, respectively. The cells may be liquid crystal cells having a plurality of picture elements which change from a more scattering state to a less scattering state upon application of an input such as an electric field. The first and second surfaces of the prism may be coated with multilayer dichroic reflective coatings. Each of the first and second angles to the optic axis may be in the range of about 55° to 85°, and more particularly in the range of about 60° to 70°, and even more particularly may be about 65°.

In another aspect, the invention is directed to an system for color dispersion and recombination. The system comprises an aperture for a light beam. The normal to the aperture defines an optic axis. A first coated glass plate intersects the optic axis and has a surface oriented at a first angle to the optic axis. The first angle is greater than 45°. The surface of the first coated glass plate disperses the light beam into a first component and an intermediate component. A second coated glass plate intersects the optic axis and has a surface oriented at a second angle to the optic axis. The second coated glass plate disperses the intermediate component of the light beam into a second component and a third component.

In another aspect, the invention is directed to a projection system. The system has a light source, a reflector adjacent the light source for directing the light to a steering mirror and a field lens for collecting light received from the steering mirror. A prism is provided to collect light from the field lens. The prism may be such as described above.

In another aspect, the invention is directed to a prism having at least one working face located along the periphery thereof for color dispersion and recombination. The prism comprises an aperture for a light beam, where the normal to the aperture defines an optic axis. A plurality of surfaces intersect the optic axis and at least one of the plurality of surfaces is oriented at a first angle to the optic axis. The first angle is greater than 45° and disperses the light beam into a first component and an intermediate component. The first component passes directly to the working face from one of the plurality of surfaces. The plurality of surfaces includes dichroic surfaces.

An advantage of the invention is that the ratio of the light exiting the prism to the light entering the prism is high because light reflected inside the prism is only weakly polarization dependent.

A further advantage of the invention is that the use of a prism structure makes the system rugged, easy to mount, and useful for beam superposition applications. Prisms deform less when subjected to stress than coated plates. Coatings used in prisms are resistant to degradation because they are usually sealed within the body of the cube.

BRIEF DESCRIPTION OF THE DRAWINGS

The accompanying figures, which are incorporated in and constitute a part of the specification, schematically illustrate the invention and, together with the general description given above and the detailed description given below, serve to explain the principles of the invention.

DESCRIPTION OF THE PREFERRED EMBODIMENTS

Figure 4:
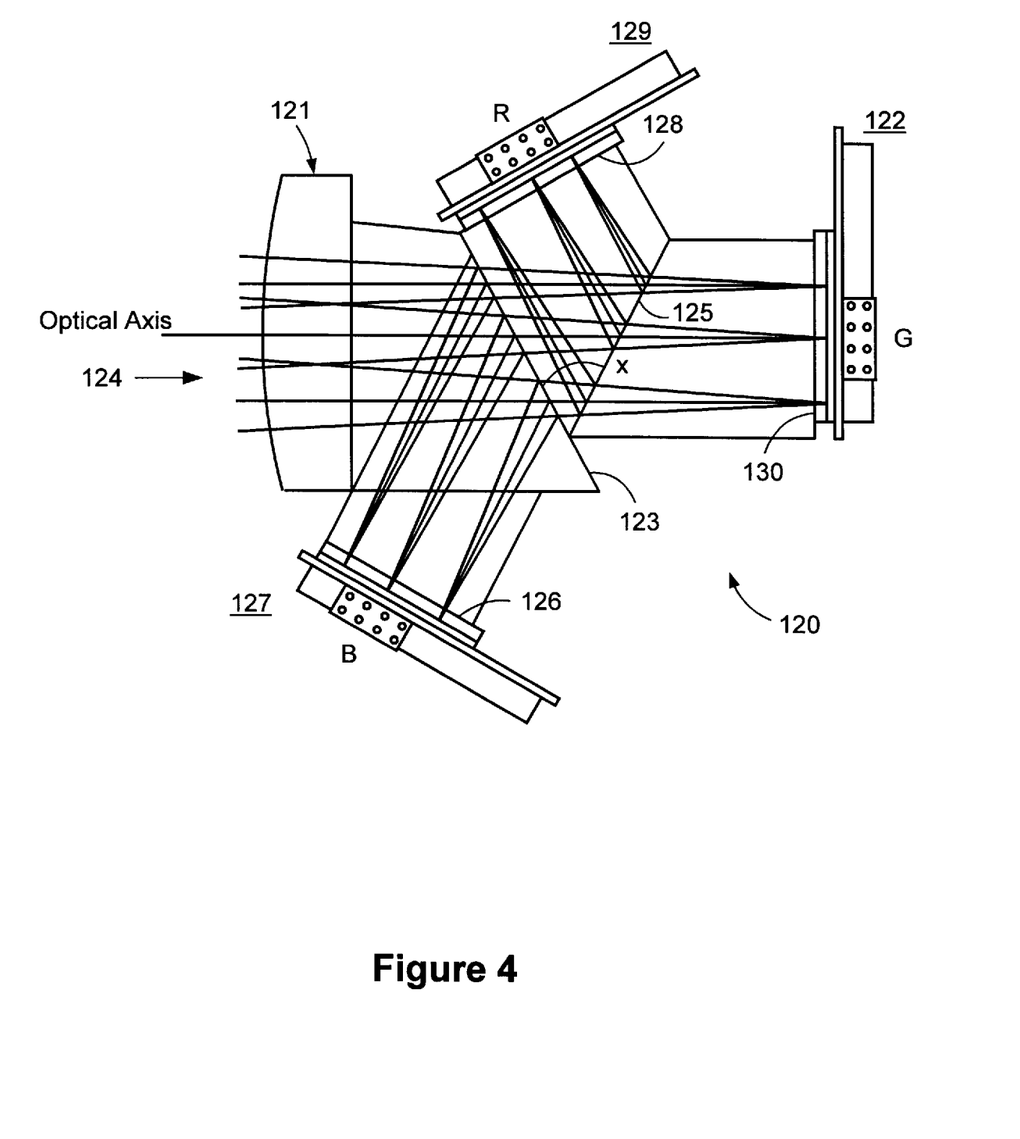
FIG. 4 is a top plan view of an embodiment of the present invention.

Referring to FIG. 4, a color projection prism 120 includes an aperture 121. Aperture 121 is the area through which the white light enters the prism and through which the color-imaged light exits the prism. It may be as simple as the face of the prism itself, but is usually defined by the aperture of the lens. The normal to the plane of aperture 121 generally defines an optic axis of the system. First, second and third reflection cells 122, 127 and 129 are also provided and are denoted here as green (G) cell 122, blue (B) cell 127 and red (R) cell 129. Such cells, which may be of the type using nematic curvilinear aligned phases (NCAP) liquid crystal materials or other types, are often used with the color projection prism of the present invention to form a color projection system, but this is not necessary.

An NCAP liquid crystal cell uses a liquid crystal material which is encapsulated in or dispersed in a containment medium such as a polymer. Suitable encapsulating media include, but are not limited to, gelatin, polyurethane, polyethylene oxide, polyvinyl pyrrolidone, cellulosic polymers, natural gums, acrylic and methacrylic copolymers, epoxies, polyolefins, vinyl polymers, aqueous lattices, and the like. In particular, the encapsulating medium may be polyvinyl alcohol or a polyurethane latex. The liquid crystal material may be nematic or operationally nematic, and may have a positive dielectric anisotropy. Alternately, the liquid crystal material may be smectic or chiral nematic. In addition, a pleochroic dye may be dissolved in the liquid crystal material.

Generally, such liquid crystal cells have a plurality of picture elements which change from a more scattering state to a less scattering state upon application of an input, such as an electric field.

Prism 120 may be constructed of a number of prism segments. These prism segments have at least some surfaces which are coated with dichroic thin film reflectors such as a multilayer stack of alternating refractive index materials. The precise design of the multilayer stack depends on the requirements of the designer. The segments are bonded together with an adhesive to form prism 120. In FIG. 4, two coated surfaces are formed: first surface 123 and second surface 125. The coatings of these surfaces are dichroic. The angle x between surfaces 123 and 125 is generally less than 90°.

White light enters the prism 120 along the direction of arrow 124. The angle θ represents the angle formed by surface 123 and optic axis 124, and is greater than 45°. This white light beam may be generated by an arc lamp, for example. A first component of the white light, in particular the blue beam, is reflected from surface 123 and is directed towards a first working face 126 of the prism, adjacent to which is blue cell 127. The term "working face" is defined herein as a face on which an active optic element would be placed or a face through which light may be directed to a cell. First working face, as well as second and third working faces described below, are generally located along different portions of the periphery of the prism.

The choice of which color beam is reflected first is dependent on the nature of surface 123 and may be changed according to the preference of the user. Usually either blue or red is reflected first because 1) they are nearer to the ends of the spectrum and 2) high and low pass reflectors are easier to form than band pass reflectors. In particular, the coating of surface 123 is a multilayer stack of alternating refractive index materials, e.g., silicon dioxide with a refractive index of about 1.5 and alumina with a refractive index of about 1.7. The thickness of each layer is designed to reflect substantially all light below a certain wavelength, e.g., for blue, 490 nm is used. For red light, they are designed to reflect substantially all light above a certain wavelength, e.g., 570 nm. The reflection from surface 123 may cause some disparity between the s-polarized and p-polarized portions of the blue beam, as described above in connection with FIG. 3(a). However, the closer surface 123 is to being 90° to the optic axis, the less this difference will be.

Surface 123 is designed to increase the angle to the optic axis. It is oriented at a first angle to the optic axis of greater than 45°. This first angle may be in the range of about 55° to 85°, and can be about 65°. In part, as this angle is closer to normal than, for example, a 45° angle, the amount of polarization introduced into the beam, in this case the blue beam, is less than in prior systems.

Blue cell 127 imparts an image to the blue beam and reflects the same back towards surface 123. Blue cell 127 may have a partial depolarizing effect on the blue beam, as described above. However, in the present embodiment, the blue beam leaves surface 123 with less difference between its s- and p-polarizations (because of the angle to the optic axis) than, for example, if the angle to the optic axis was 45°. Therefore, there is less chance of the blue beam being transmitted by surface 123 on its return.

The blue beam emerges from blue cell 127, passes through the first working face 126 of the prism, and is directed towards surface 123. Surface 123 reflects the blue beam back in a direction parallel but opposite to arrow 124.

Light transmitted through surface 123 is composed of an intermediate component: the white light minus the blue beam. This light is incident on surface 125 at an angle to the optic axis which is again greater than 45°. This surface disperses the intermediate component into second and third components, i.e., into a reflected red beam and a transmitted green beam.

A polarization effect similar to that above occurs for the red beam. The reflection from surface 125 partially polarizes the red beam. However, surface 125 provides an angle to the optic axis which is closer to normal, i.e., 90°, than in prior systems. Surface 125 may provide an angle to the optic axis in the range of about 55° to 85°, and can be about 65°. Therefore, for the same reasons as above, surface 125 introduces less of a difference between the polarizations of the beam, i.e., less polarization dependence, than if the angle to the optic axis were, for example, 45°.

Surface 125 reflects the red beam towards a second working face 128 and red cell 129, and transmits the remaining light, the green beam, towards a third working face 130 and green cell 122. Red cell 129 imparts an image to the red beam and reflects the same back towards surface 125. Surface 125 directs the beam in a direction parallel but opposite to arrow 124. Any light is which transmitted through surface 125 is lost by multiple reflection and scattering. Any depolarizing effects of red cell 129 will produce, at most, only minimal effects on the red beam because of the dichroic surface's weak polarization dependence.

The green beam represents the remainder of the light after the blue and red beams are removed by reflections from surfaces 123 and 125. The green beam is transmitted directly through the prism with little change in angle and is incident on green cell 122 because the dichroic surfaces do not reflect green light. Rather, they allow it to pass through without angular deviation. Green cell 122 imparts an image to the green beam and reflects the green beam back towards surface 125. The green beam passes through surface 125 and is recombined with the reflected red beam. The combination then passes through surface 123 where it is also recombined with the blue beam. The combination of the red, green and blue beams then emerges from aperture 121 in a direction parallel but opposite to arrow 124.

In the above system, the different components of the light generally pass directly from surface 123 or surface 125 to working face 126, 128 or 130, where a direct passage refers to a passage without reflection. Of course, it is understood that such light may pass directly through a lens, without undergoing reflection, and the inclusion of such optical elements as lenses are fully contemplated by the present invention. Depending on the requirements of the optical designer, a certain subset of the components may undergo a reflection, but preferably not all.

Reflections are minimized in the present invention because any extra deviations introduce aberrations, and aberrations by mirrors are often twice as bad as those caused by refractive deviations. Of course, the more aberrations, the poorer the image. Therefore, it is preferred that the number of reflections be minimized.

Figure 5:
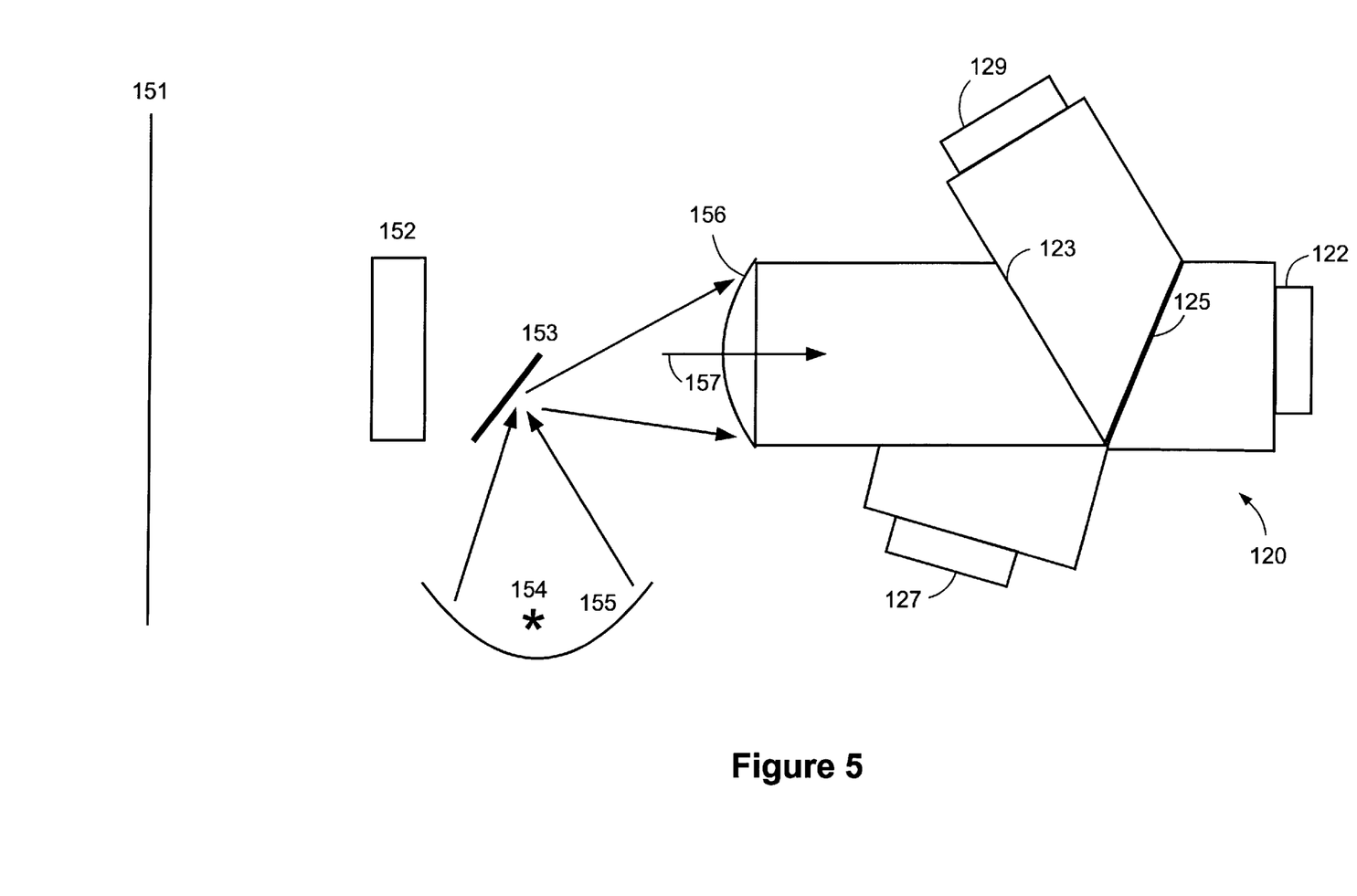
FIG. 5 is a top plan view of an embodiment of the present invention as used in a projection system.

The prism of the present invention may be used as part of an overall projection system, as shown in FIG. 5. In this system, a light source 154, which may be an arc lamp, is collimated by a parabolic reflector 155, causing light to be focused and incident on a steering mirror 153. Steering mirror 153, which is located slightly off an optic axis 157, diverges and directs the light to field lens 156, which may be identified as serving a similar purpose to aperture 121 (see FIG. 4).

The path of the light within prism 120 is the same as that described before. Of course, the choice of order in which the colors are separated is not limited by that described above. By a suitable choice of filters, the colors could be separated. If band-pass filters are employed, for example, the green beam could be separated first. Moreover, the light need not be separated into 3 colors of red, green and blue. For example, a suitable choice of filters, which may include a plurality of dichroic surfaces, may separate the white light into four or even more beams. When the light emerges from prism 120, it is directed to a projection lens 152, this lens being located on optic axis 157, and finally is projected on projection screen 151.

The present invention has been described in terms of preferred embodiments. The invention, however, is not limited to the embodiments depicted and described. Rather, the scope of the invention is defined by the appended claims.

What is claimed is:

1. A prism block for color dispersion and recombination, the prism block comprising:
   - a lens to receive a light beam, the lens being Joined to a portion of the prism block, a normal to the lens defining an optic axis;
   - a first surface of the prism block, intersecting the optic axis, oriented at a first angle to the optic axis, said first angle greater than 45° to disperse the light beam into a first component and an intermediate component;
   - first, second and third working faces located along different segments of a periphery of the prism block;
   - a second surface of the prism block, intersecting the optic axis, oriented at a second angle to the optic axis, to disperse the intermediate component of the light beam into a second component and a third component; and
   - such that at least one of the first, second or third components passes directly to the first, second or third working faces, respectively, from one of the first or second surfaces,
   - wherein the first and second surfaces and the first, second and third working faces comprise a unitary body.

2. The prism of claim 1, further comprising first, second and third cells for imparting images to the first, second and third components, respectively.

3. The prism of claim 2, wherein said cells are liquid crystal display cells having a plurality of picture elements which change from a more scattering state to a less scattering state upon application of an input.

4. The prism of claim 1, wherein said first and second surfaces are coated with multilayer dichroic reflective coatings.

5. The prism block of claim 1, wherein the first angle is in the range of about 55° to 85°.

6. The prism of claim 5, wherein the first angle is in the range of about 60° to 70°.

7. The prism of claim 6, wherein the first angle is about 65°.

8. The prism block of claim 1, wherein the second angle is in the range of about 55° to 85°.

9. The prism of claim 8, wherein the second angle is in the range of about 60° to 70°.

10. The prism of claim 9, wherein the second angle is about 65°.

11. A projection system, comprising:
    - a light source;
    - a reflector adjacent said light source to direct light to a steering mirror;
    - a field lens to collect the light received from said steering mirror;
    - a prism block to collect the light from said field lens, the prism block including:
      (i) an aperture to receive the light, said aperture being located at a periphery of the prism block, a normal to said aperture defining an optic axis,
      (ii) a first surface, intersecting the optic axis, oriented at a first angle to the optic axis, said first angle greater than 45° to disperse the light into a first component and an intermediate component, and
      (iii) a second surface, intersecting the optic axis, oriented at a second angle to the optic axis, to disperse the intermediate component of the light into a second component and a third component;
    - first, second and third cells to impart images to the first, second and third components, respectively; and
    - such that at least one of the first, second or third components passes directly to the first, second or third cells, respectively, from one of the first or second surfaces,
    - wherein the first and second surfaces, and the first, second and third cells comprise a unitary body.

12. The projection system of claim 11, wherein said cells are liquid crystal display cells having a plurality of picture elements which change from a more scattering state to a less scattering state upon application of an input.

13. A prism block having at least one working face located at a periphery thereof for color dispersion and recombination, comprising:
    - a lens formed as a part of the prism block to receive a light beam, a normal to said lens defining an optic axis;
    - a plurality of surfaces intersecting the optic axis, at least one of said plurality of surfaces oriented at a first angle to the optic axis, said first angle greater than 45° to disperse the light beam into a first component and an intermediate component; and
    - such that the first component passes directly to the working face from one of the plurality of surfaces,
    - wherein the plurality of surfaces comprise a unitary body.

14. The prism of claim 13, wherein said plurality of surfaces include dichroic surfaces.

15. A prism block for color dispersion and recombination, comprising:

a light receiving portion having first and second ends, the light receiving portion including:
  (i) a lens formed integral with the light receiving portion and located at the first end of the light receiving portion to receive a light beam, a normal to said lens defining an optic axis, and
  (ii) a first surface formed integral with the light receiving portion and located at the second end of the light receiving portion, intersecting the optic axis, oriented at a first angle to the optic axis, said first angle greater than 45° to disperse the light beam into a first component and an intermediate component;
a first working portion formed integral with the light receiving portion, the first working portion including:
  (i) a first working face formed integral with the first working portion and located at one end of the first working portion, and
  (ii) a second surface formed integral with the first working portion and located at an opposite end of the first working portion, the second surface intersecting the optic axis, oriented at a second angle to the optic axis, to disperse the intermediate component of the light beam into a second component and a third component;
a second working portion formed integral with the first working portion, the second working portion including:
  (i) a second working face formed integral with the second working portion and located at one end of the second working portion, and
  (ii) the second surface formed integral with the second working portion and located at an opposite end of the second working portion;
a third working portion formed integral with the light receiving portion, the third working portion having a third working face located at one end of the third working portion; and
such that at least one of the first, second or third components passes directly to the first, second or third working faces, respectively, from one of the first or second surfaces.

16. The prism block of claim 15, wherein the first angle is in the range of about 55° to 85°.

17. The prism block of claim 16, wherein the first angle is in the range of about 60° to 70°.

18. The prism block of claim 17, wherein the first angle is about 65°.

19. The prism of claim 15, wherein the second angle is in the range of about 55° to 85°.

20. The prism of claim 19, wherein the second angle is in the range of about 60° to 70°.

21. The prism of claim 20, wherein the second angle is about 65°.

* * * * *